US006598136B1

United States Patent

(12) United States Patent
Norrod et al.

(10) Patent No.: US 6,598,136 B1
(45) Date of Patent: Jul. 22, 2003

(54) DATA TRANSFER WITH HIGHLY GRANULAR CACHEABILITY CONTROL BETWEEN MEMORY AND A SCRATCHPAD AREA

(75) Inventors: Forrest E. Norrod, Boulder, CO (US); Christopher G. Wilcox, Ft. Collins, CO (US); Brian D. Falardeau, Boulder, CO (US); Willard S. Briggs, Boulder, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 08/950,513

(22) Filed: Oct. 22, 1997

Related U.S. Application Data

(63) Continuation of application No. 08/540,300, filed on Oct. 6, 1995, now abandoned.

(51) Int. Cl.[7] .......... G06F 13/00

(52) U.S. Cl. .......... 711/165; 711/129; 711/154; 345/562; 345/537

(58) Field of Search .......... 711/129, 117, 711/154, 165, 138; 345/525, 511, 562, 537, 557; 710/5

(56) References Cited

U.S. PATENT DOCUMENTS

| | | | | | |
|---|---|---|---|---|---|
| 4,797,853 | A | * | 1/1989 | Savage et al. | 395/842 |
| 4,845,656 | A | * | 7/1989 | Nishibe et al. | 345/525 |
| 4,873,652 | A | * | 10/1989 | Pilat et al. | 345/340 |
| 5,016,165 | A | * | 5/1991 | Tanikawa et al. | 395/842 |
| 5,157,774 | A | * | 10/1992 | Culley | 711/139 |
| 5,218,674 | A | * | 6/1993 | Peaslee et al. | 345/525 |
| 5,317,715 | A | * | 5/1994 | Johnson et al. | 395/842 |
| 5,444,853 | A | * | 8/1995 | Lentz | 395/250 |
| 5,530,799 | A | * | 6/1996 | Marsh et al. | 345/507 |
| 5,636,362 | A | * | 6/1997 | Stone et al. | 711/129 |
| 5,831,637 | A | * | 11/1998 | Young et al. | 345/501 |
| 5,860,081 | A | * | 1/1999 | Herring et al. | 711/100 |

OTHER PUBLICATIONS

Luigi Ciminiera & Adriano Valenzano, "Advanced Microprocessor Architectures", Addison–Wesley Publishing Company, pp 193–195, 1987.*

"Microprocessors," vol. I, Intel Corp., pp 2–48 thru 2–83, 1992.*

* cited by examiner

*Primary Examiner*—Hong Kim

(57) ABSTRACT

A processing system having a CPU core and a cache transfers data between a first block of memory and a second block of memory that is preferably partitioned out of the cache as a non-cacheable scratchpad area and performs address calculations with protection and privilege checks without polluting the cache. Responsive to executing a predetermined instruction, the CPU core signals the cache to prevent caching data during transfer from system to scratchpad memory thereby reducing the number of bus turnarounds while maintaining byte granularity addressability.

10 Claims, 3 Drawing Sheets

DATA TRANSFER WITH HIGHLY GRANULAR CACHEABILITY CONTROL BETWEEN MEMORY AND A SCRATCHPAD AREA

The present application is a file wrapper continuation of copending application Ser. No. 08/540,300 filed Oct. 6, 1995, now abandoned.

BACKGROUND OF THE INVENTION

1. Field of the Invention

The invention generally relates to data movement in a computer, and more particularly to a system and method of moving data to and from portions of memory with cacheability being controllable on an individual operational basis.

2. Description of Related Art

Reference is made to FIG. 1 which depicts a typical personnel computer (PC) system with an x86 architecture for displaying graphics. A central processing unit (CPU) 50 having multiple registers (e.g. CS, DS, ES . . . ECX, EDI, ESI) is coupled through a CPU bus 52 to a memory controller 54. The memory controller 54 is coupled to system memory 56, typically DRAM, and to a relatively fast local or "mezzanine" bus 58, typically having a protocol in accordance with the Video Electronics Standards Association VL-bus or with the Peripheral Component Interconnect (PCI) bus. The local bus 58 is coupled to a relatively slow Industry Standard Architecture (ISA) bus 60 through a bus converter 62.

The local bus 58 couples a graphics adapter card 64 to the memory controller 54 and to the bus converter 62. The location and color for each pixel displayed on display 66 is stored in a frame buffer memory 68 on the graphics adapter card 64. A RAMDAC 70 on the graphics adapter card 64 converts the data stored in the frame buffer memory 68 to analog signals to drive the display 66 which is typically a cathode ray tube (CRT) or a liquid crystal display (LCD). Each time a change is made in the graphics on display 66, the location and color for each pixel must be recalculated and stored in the frame buffer memory 68.

The CPU 50 typically calculates the location and color definition of each changed pixel and sends the resulting information across the local bus 58 to the frame buffer memory 68 on the graphics adapter card 64. Alternatively, a graphics accelerator 72 reduces the burden from the CPU 50 by receiving certain graphic calls (e.g. fills and line draws) through a graphics driver executed by the CPU 50, to calculate the changes in the pixels and to fill the frame buffer memory 68 with updated graphics data.

The so-called BitBlt graphic call ("bit blit") performs an operation by transferring blocks of graphics data from: system memory 56 to frame buffer memory 68, frame buffer memory 68 to system memory 56, and between different portions within the frame buffer memory 68. The graphics accelerator 72 can effectively handle the BitBlt operation to the extent that data is already stored in the frame buffer memory 68 and the destination is also in the frame buffer memory 68. The CPU 50 however, must still be involved to provide privilege and protection checks if the BitBlt operation requires bitmapped images to be moved from external system memory 56 to the frame buffer memory 68 and from the frame buffer memory 68 to the external system memory 56. The CPU 50 typically handles this through recursive steps, which in x86 architecture parlance, is often a repeat move string instruction of the form:

REP MOVS [ESI (source address), EDI (destination address)] wherein a number of bytes, words, or Dwords of data specified by the ECX register starting at an address pointed to by ESI are moved to a block of memory pointed to by EDI.

The required intervention by the CPU 50 has a large latency associated with it since data must be read from the system memory 56 through the memory controller 54 over the CPU bus 52 into the internal registers of the CPU 50. The CPU 50 must then turnaround and write the data from its registers over the CPU bus 52 through the memory controller 54 onto the local bus 58 to the frame buffer memory 68 on the graphics adapter card 64. Likewise, data must be read from frame buffer memory 68 on the graphics adapter card 64 through the memory controller 54 over the CPU bus 52 into the internal registers of the CPU 50. The CPU 50 must then turnaround and write the data from its registers over the CPU bus 52 through the memory controller 54 to the system memory 56.

The process just described is further complicated by the use of a cache 74. As a way of background, a cache 74, simply put, is a relatively small but fast-access buffer area wherein a copy of previously accessed data, typically spatially or temporally related, is held in hope that subsequent accesses will benefit from the spatial or temporal locality. In other words, the intent of the cache 74 is to reduce the latency associated with data accesses normally made to slow memory by keeping a copy of most recent data readily available. However in the case of reading bitmapped data from system memory 56 to update the display 66, a cache 74 is not significantly advantageous and in fact, can actually hinder performance. To this end, the amount of display information which updates the display is overwhelming compared to the size of the cache 74 and caching the display information has little, if any, impact on performance. More importantly however, by caching the display information, valuable instructions and data are evicted from the cache 74 requiring longer access times to retrieve them from secondary cache or main memory.

As a way of further background, known ways under the x86 architecture to designate data as non-cacheable include non-assertion of the cache enable (KEN# pin) by chipset logic circuitry or by setting a page cache disable (PCD) bit in the directory and page table entries (DTE and PTE). A drawback with using the KEN# pin is that it requires external chipset logic circuitry to determine cacheability. A drawback with using the PCD bit is that the finest gradation of cacheability is made on a page-by-page basis.

In a related, but not entirely relevant technique, direct memory access (DMA) transfers are known which can move the contents of one memory block directly to the contents of another memory block without substantial intervention by the CPU 50. However, these DMA techniques are ineffective, inter alia, for systems having protection or privilege check mechanisms.

Accordingly there is a need for a system and a method of cacheability control on an individual operational basis, for moving data from a first block of memory to a second block of memory, in a system having protection and privilege check mechanisms, without substantial CPU intervention, without long bus turnaround time, and without polluting the cache.

SUMMARY OF THE INVENTION

To overcome the limitations of the prior art described above, and to overcome other limitations that will become apparent upon reading and understanding the present specification, the present invention discloses a method in a processing system having a cache, of transferring blocks of data from a first block of memory to a second block of memory, employing signaling from a CPU core responsive to execution of a predetermined instruction, so that data is transferred directly from the first block of memory to the second block of memory without polluting the cache. The second block of memory is typically scratchpad memory which is preferably, although not exclusively, a partitionable area of the cache. While a destination address is preferably generated from a programmable address register provided as part of control circuitry in the scratchpad memory, it is contemplated that an instruction in accordance with the present invention, could also directly specify a destination address.

A feature of the present invention is transferring data from system memory to scratchpad memory without substantial CPU intervention while maintaining protection and privilege check mechanisms for memory address calculations.

Another feature of the present invention is transferring data from system memory to a scratchpad memory in large blocks to reduce the number of bus turnarounds while maintaining byte granularity addressability.

Another feature of the present invention is transferring data from system memory to scratchpad memory in a system having a cache without polluting the cache.

Another feature of the present invention is effective communication between a CPU core and a graphics pipeline by employing scratchpad memory control circuitry containing data pointers used by both the CPU core and the graphics pipeline to address data in the scratchpad memory.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a system and method of data transfer with cacheability control, practiced in accordance with the present invention.

DESCRIPTION OF THE PREFERRED EMBODIMENT

Figure 1:
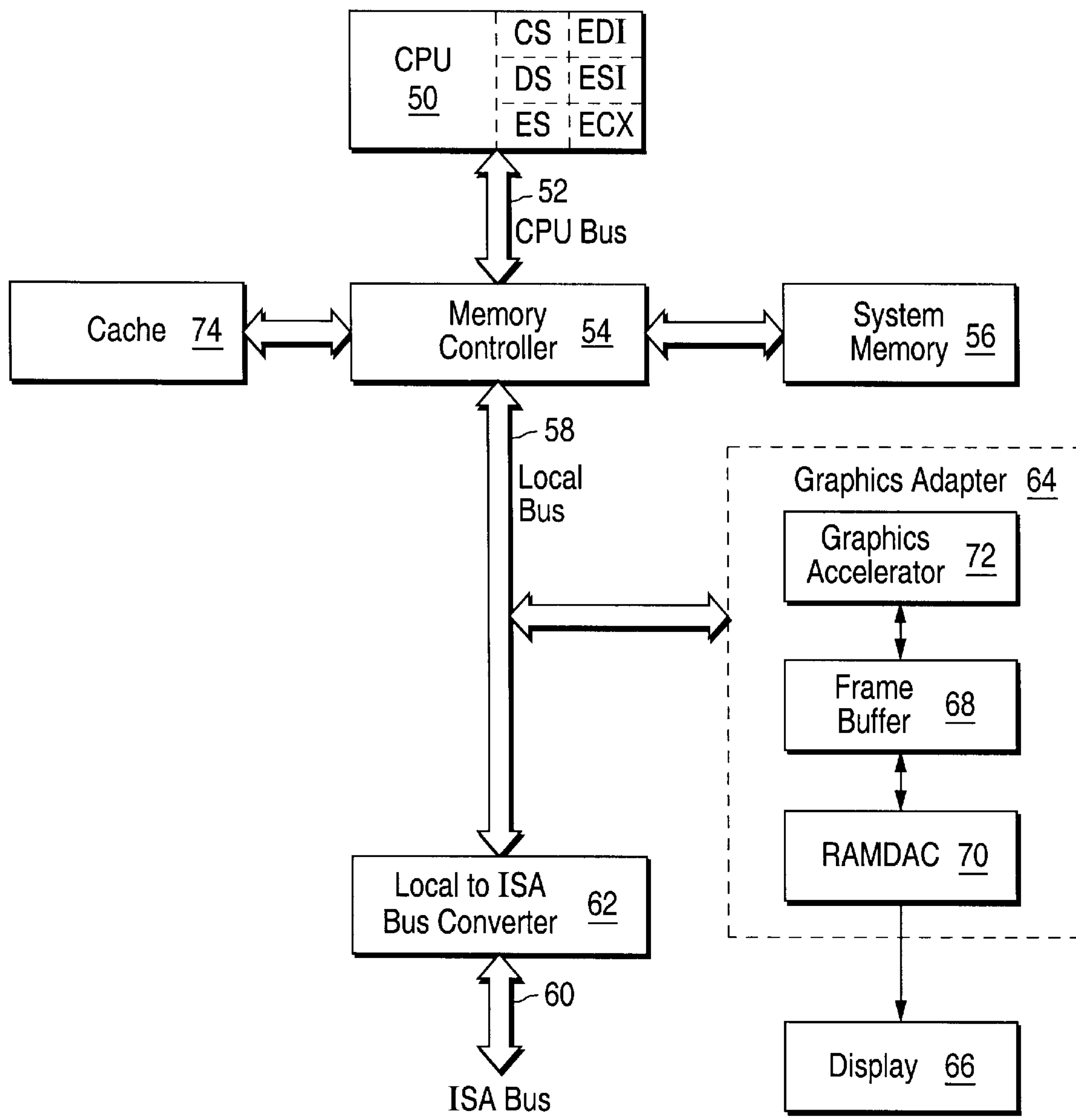
FIG. 1 is a block diagram of a prior art system for displaying graphics in a computer.

The detailed description of the preferred embodiment for the present invention is organized as follows:

1. Exemplary System Employing Data Transfer With Cacheability Control
2. L1 Cache Fill
3. Data Transfer From System Memory To Scratchpad Memory
4. Exemplary Application For A System-To-Scratchpad Memory Instruction
5. Conclusion This organizational table, and the corresponding headings used in this detailed description, are provided for the convenience of reference only and are not intended to limit the scope of the present invention. It is to be understood that while the, preferred embodiment is described hereinbelow with respect to the x86 computer architecture, it has generally applicability to any architecture. Certain terminology related to the x86 computer architecture (such as register names, signal nomenclature, etc.) which is known to practitioners in the field of microprocessor design, is not discussed in detail in order not to obscure the disclosure.

Moreover, structural details which will be readily apparent to those skilled in the art having the benefit of the description herein have been illustrated in the drawings by readily understandable block representations and flow diagrams, showing and describing only those details that are pertinent to the present invention. The block and flow diagrams in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

1. Exemplary System Employing Data Transfer With Cacheability Control

Figure 2:
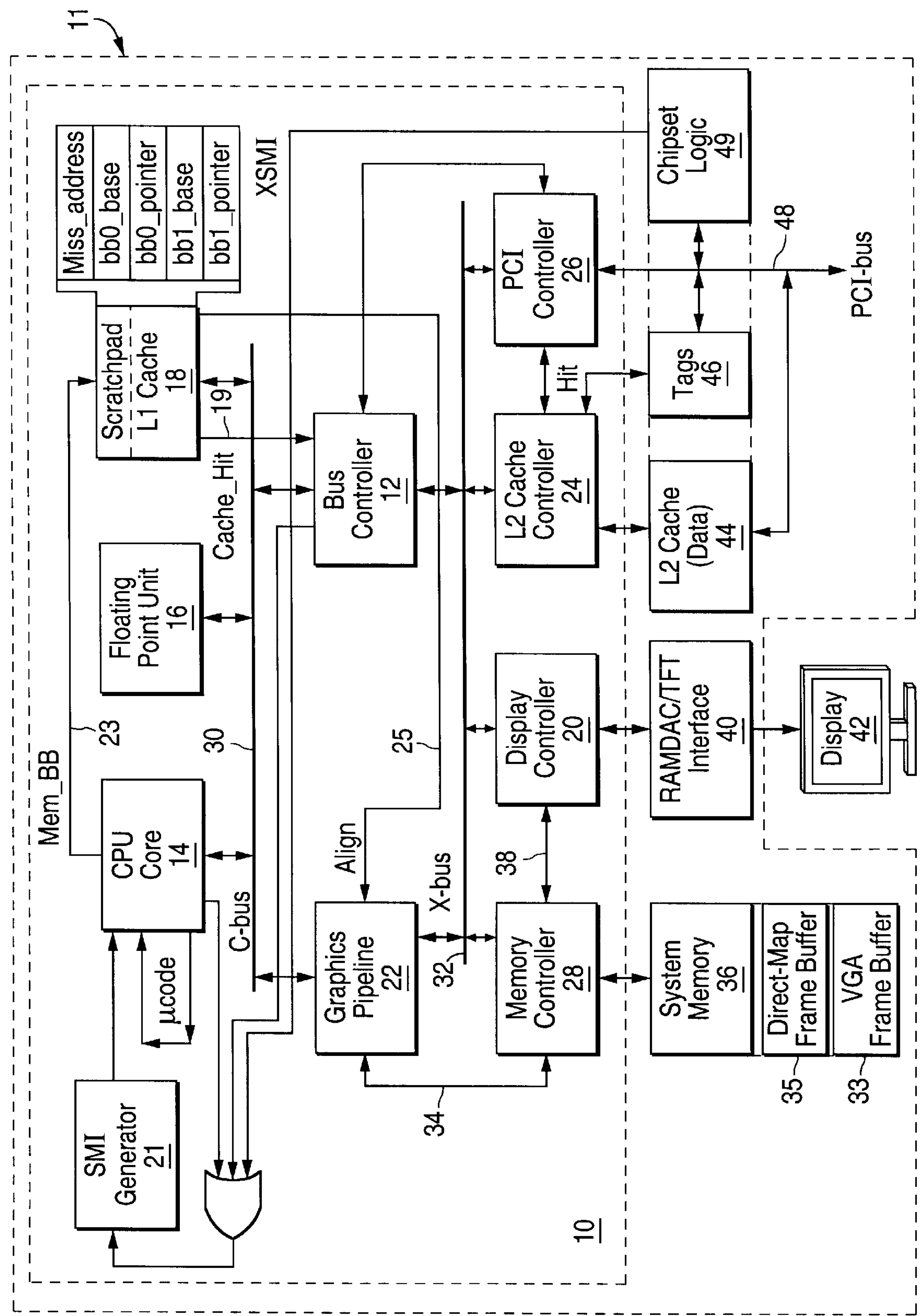
FIG. 2 is a block diagram of a processing system practiced in accordance with the principles of the present invention.

Reference is now made to FIG. 2 which depicts an exemplary, but not exclusive system employing a method of transferring data, practiced in accordance with the principles of the present invention. A system circuit board 11 (a.k.a. motherboard) preferably includes buses to couple together a CPU 10, system memory 36, a RAMDAC/thin film transistor display panel interface 40, L2 cache 44, and chipset logic circuitry 49. A multi-tasking operating system program such as Microsoft® Windows™ preferably executes on the CPU 10 to manage primary operations.

The CPU 10 preferably includes the following functional units: an internal bus controller 12, a CPU core 14, a (level-one) L1 cache 18—part of which is partitionable as a scratchpad memory, a memory controller 28, a floating point unit (FPU) 16, a display controller 20, an internal SMI generator 21, a graphics pipeline (a.k.a. graphics accelerator) 22, a (level-two) L2 cache controller 24, and a PCI-bus controller 26.

The bus controller 12, the CPU core 14, the FPU 16, the L1 cache 18, and the graphics pipeline 22, are coupled together through an internal (with respect to the CPU 10) C-bus 30 whose exact configuration is not necessary for the understanding of the present invention. The bus controller 12, display controller 20, the graphics pipeline 22, the L2 cache controller 24, the PCI-bus controller 26, and the memory controller 28 are coupled together through an internal (with respect to the CPU 10) X-bus 32. The details of the C-bus 30 and X-bus 32 are not necessary for the understanding of the present invention. It is sufficient to understand that independent C and X buses 30 and 32 decouple these functional units within the CPU 10 so that for example, the CPU core 14, the FPU 16, and L1 cache 18 can operate substantially autonomously from the remainder of the CPU 10 and so that other activities (e.g. PCI-bus transfers, L2 cache transfers, and graphics updates) can be conducted independently. More specifically, the C-bus 30 has sufficient bandwidth to allow the graphics pipeline 22 to access the scratchpad memory while the CPU core 14 is performing an unrelated operation.

The CPU core 14 in the preferred embodiment is a six stage pipeline. The exact details of the CPU core 14 pipe stages however, are not important for the understanding of the present invention. It is sufficient to understand that a plurality of bytes are fetched into a buffer during the instruction fetch (first) stage, decode and scoreboard checks are performed during the instruction decode (second) stage, linear memory address calculations are performed during a pre-address calculation (third) stage, physical address calculations are performed during an address translation (fourth) stage, instructions are executed during the execution (fifth) stage, and the results of the instruction execution are written to write buffers during the writeback (sixth) stage. Those skilled in the art, with the aid of the present disclosure, will recognize other number of stages for the pipeline and other configurations for the CPU core 14 without departing from the scope of the present invention.

The L1 cache 18 is preferably, although not exclusively, a 16K byte unified data/instruction cache that operates in either a write-through or write-back mode. An area of the L1 cache 18 can be programmably partitioned as the scratchpad memory through configuration control registers (not shown) in the CPU core 14. Scratchpad control circuitry in the L1 cache 18 includes data pointers which can be used by either the CPU core 14 or the graphics pipeline 22 to access data in the scratchpad memory. The scratchpad memory may also be addressed directly by the CPU core 14.

An exemplary, but not exclusive, use for the scratchpad memory is as a blit buffer for use by the graphics pipeline 22. More specifically, whenever data is moved on the display 42, a raster line (scanline) or portion thereof, of data is read from the direct-mapped frame buffer 35 (preferably in system memory 36), written to the blit buffer partitioned out of the L1 cache 18, and then read back out and written to another region of the direct-mapped frame buffer 35. Programs executed by the CPU core 14 can also directly put data into the blit buffer and have the graphics pipeline 22 autonomously read it out and put it in the direct-mapped frame buffer 35.

The preferred L1 cache 18, along with other exemplary applications for the scratchpad memory, are described in co-pending U.S. patent application Ser. No: 08/464,921, filed Jun. 05, 1995, entitled "Partionable Cache", assigned to the Assignee of the present invention and herein incorporated by reference. It is to be understood however, that the L1 cache 18 may be larger or smaller in size or may have a Harvard "split" architecture without departing from the scope of the present invention. It is also to be understood that the scratchpad memory may be a memory separate for the L1 cache 18 without departing from the scope of the present invention.

The graphics pipeline 22 is coupled to the memory controller 28 through a dedicated bus 34 that expedites block moves of data from the scratchpad memory (blit buffer) to the VGA frame buffer 33 and to the direct-mapped frame buffer memory 35, which in the preferred embodiment, resides as part of system memory 36. The direct-mapped frame buffer memory 35 is addressed through the memory controller 28 producing a base address and the graphics pipeline 22 producing an offset, avoiding protection and privilege checks normally associated with address generation.

BitBlt operations of the graphics pipeline 22 are initiated by writing to a control register (not shown) in the CPU core 14 which specifies: i) the type of source data required, if any, frame buffer, or blit buffer; ii) the type of destination data required, if any, frame buffer, or blit buffer; iii) where the graphics pipeline 22 writes the data, direct-mapped frame buffer 35, or system memory 36, and iv) a source expansion flag. When the source is an image in system memory 36, the data is loaded from system memory 36 into the blit buffer before starting the BitBlt operation. Destination data is also loaded into the blit buffer when the graphics pipeline 22 renders to system memory 36.

The internal bus controller 12 coordinates and prioritizes transfers between the C and X buses 30 and 32, respectively. The memory controller 28 controls main system memory 36 and cooperates with the internal bus controller 12 to determine cacheability and permits all DMA cycles to automatically snoop the L1 cache 18 and the L2 cache 44. The FPU 16 performs floating point operations.

The display controller 20 which is coupled to the memory controller 28 through a fast link 38, retrieves image data from the direct-mapped frame buffer memory 35, performs a color look-up if required, inserts cursor and icon overlays into a pixel data stream, generates timing, and formats the pixel data for output to the RAMDAC/Thin Film Transistor (TFT) interface 40 which in turn drives a display 42.

The L2 cache controller 24 and PCI controller 26 collectively provide, inter alia, a high speed interface for an "off-chip" L2 cache 44 (with respect to the CPU 10). The preferred, although not exclusive, L2 cache interface is described in U.S. Pat. No. 5,860,091, assigned to the Assignee of the present invention and herein incorporated by reference. It is to be understood however, that other forms for the L2 cache interface may be practiced without departing from the scope of the present invention. It should also be understood that while the L2 cache 44 shares the same physical data, address, and control lines on the PCI-bus 48, that for performance reasons, the clock speed and communication protocol are not necessarily related to the PCI protocol. Data accesses to the L2 cache 44 are mutually exclusive with other "PCI-like" PCI-bus 48 accesses, however, writes to the PCI-bus 48 do access the cache tag and control logic circuitry 46 and invalidate the tag on a hit.

In the preferred embodiment, the cache tag and control logic circuitry 46, which determines whether a hit/miss has occurred, is provided separately from the data cache 44 in external chipset logic circuitry 49. Those skilled in the art will recognize other forms and arrangements for the cache tag and control logic circuitry 46, such as, but not limited to, integrated circuitry onto the CPU 10, without departing from the scope of the present invention.

The SMI generator 21 receives a first input from the CPU core 14, a second input from the internal bus controller 12, and a third input (XSMI) from a source external to the CPU 10, preferably from the chipset logic circuitry 49. Chipset logic circuitry 49 is coupled to the PCI-bus 46 and preferably has interface logic including, but not limited to, FIFO buffers for receiving incoming and outgoing data and indicators to indicate fullness of a given buffer. The chipset logic circuitry 49 preferably also includes comparators and other trap circuitry to detect and indicate the occurrence of predetermined events outside the CPU 10.

2. L1 Cache Fill

A fill of the L1 cache 18 is described with reference to FIG. 2. The CPU core 14 presents an address for requested read data on the C-bus 30. The address is compared with tags in the L1 cache 18 to determine whether the requested read data resides in the L1 cache 18. If the requested data resides in the L1 cache 18, the cache_hit line 19 to the internal bus controller 12 is asserted and the requested data is presented on the C-bus 30. If the requested data does not reside in the L1 cache 18, the address of the requested data is stored in a Miss_address buffer in the L1 cache 18 and ostensibly, the cache hit line 19 is not asserted. When a miss occurs in the L1 cache 18, the bus controller 12 requests a burst read from system memory 36 which includes the requested data to fill a line in the L1 cache 18. The cache line and its associated tags are filled beginning at the address specified in the Miss_address buffer.

3. Data Transfer From System Memory To Scratchpad Memory

In accordance with the principles of the present invention, the preferred embodiment provides a system-to-scratchpad memory instruction executable by the CPU core 14 to move data, typically, although not exclusively, graphics data, on a scanline basis or portion thereof, from system memory 36 to the scratchpad memory which is preferably, although not exclusively, a partitioned area of the L1 cache 18. The execution of the system-to-scratchpad memory instruction does not change any flags in a flag register in the CPU core 14, does not cache any data moved from system memory 36 to scratchpad memory, but does however generate protection and privilege check exceptions as appropriate, including, but not limited to, a general protection fault for illegal memory addresses and for page faults. The flag register and the presently preferred protection and privilege check mechanisms are described in detail in the Cx486DX/DX2™ 3 and 5 Volt Microprocessor Data Book, dated March 1994, by the Cyrix Corporation of Richardson, Tex., the Assignee of the present invention, said data book herein incorporated by reference.

4. Exemplary Application For A System-To-Scratchpad Memory Instruction

An exemplary, although not exclusive application of the system-to-scratchpad memory instruction is moving graphics data stored in system memory 36 to the scratchpad memory for subsequent "blit" operations by the graphics pipeline 22. The scratchpad area is preferably partitioned out of the L1 cache 18 and therefore is referred to as a "blit buffer". The instruction for moving data from system memory 36 to the blit buffer is therefore referred to as MEM_BB. It is to be understood that the blit buffer could reside elsewhere other than a partitioned area of the L1 cache 18 without departing from the scope of the present invention.

The blit buffer in the preferred embodiment is partitioned into first and second areas bb0 and bb1, respectively. Those skilled in the art will readily recognize, with the aid of the present disclosure, other partitions without departing from the scope and spirit of the present invention.

Figure 3:
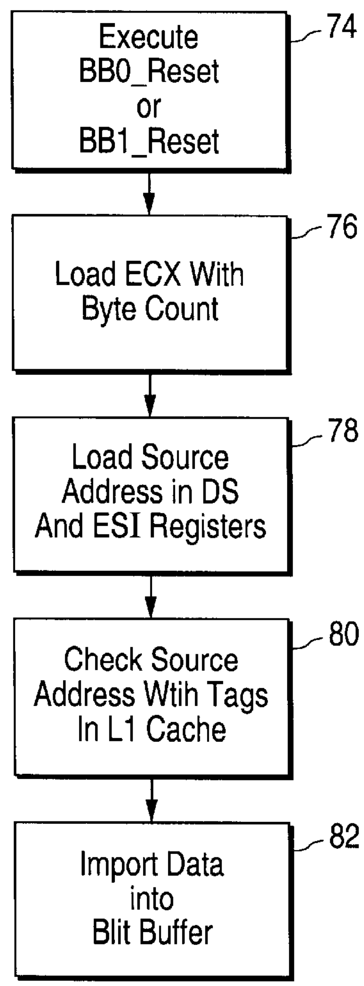
FIG. 3 is a flow diagram of a method, practiced in accordance with the principles of the present invention; and, FIG. 4 is a diagram relating system memory, cache line boundaries, and CPU core read requests, in accordance with the principles of the present invention.

Reference is now made to FIG. 3 which depicts a flow diagram of a method practiced in accordance with the principles of the present invention. In performing a data block transfer from system memory 36 to the blit buffer, the CPU core 14 first executes a blit buffer reset instruction (e.g. BB0_Reset or BB1_Reset) at step 74 before initiating the MEM_BB instruction. Execution of the BB0_Reset or BB1_Reset instruction at step 74 selects which blit buffer (bb0, bb1) pointer to use, resets the selected pointer to its base value, and informs the L1 cache 18 to save the least significant four address bits of the subsequent MEM_BB access for use by the graphics pipeline 22 to align to the start location of the blit buffer data (See FIG. 2, Align 25), described in more detail hereinbelow.

The MEM_BB instruction has the preferred syntax:

MEM_BB (byte count, source address)

In accordance with x86 architecture principles, the ECX register is loaded with the byte count at step 76 and the starting source address is specified in the data segment (DS) and extended source index (ESI) registers of the CPU core 14 at step 78. It should noted that the MEM_BB instruction could also include an additional step of specifying a destination address without departing from the scope of the present invention. At step 80, the tags in the L1 cache 18 are checked to identify whether the source address (from which importation is to begin from) resides in the L1 cache 18 rather than in system memory 36. In the preferred embodiment, if the source address does in fact reside in the L1 cache 18, it is first exported out to system memory 36 at step 80 before data is imported into the blit buffer at step 82. It should be understood that data could be sourced directly from the L1 cache 18 to the scratchpad memory without departing from the scope or spirit of the present invention.

Referring again to FIG. 2, in executing the MEM_BB instruction, the CPU core 14 issues a byte read onto the C-bus 30 and signals the L1 cache 18 by asserting the MEM_BB line 23. Responsive to the MEM_BB line 23 being asserted, the L1 cache 18 loads the contents of the selected blit buffer pointer (bb0_pointer or bb1_pointer) into the Miss_address buffer and refrains from asserting the cache_hit line 19. The bus controller 12, which monitors the C-bus 30 and cache_hit line 19, performs a cache line burst read beginning at the starting source address specified in the data segment (DS) and extended source index (ESI) registers of the CPU core 14. The bus controller 12 returns the burst read data to the L1 cache 18 beginning at the address specified in the Miss_address buffer which contains the blit buffer pointer. The blit buffer pointer is incremented by one each time a byte is transferred into the blit buffer.

The CPU core 14 calculates the difference between the starting source address specified by the MEM_BB instruction and the starting address of the next line in the L1 cache 18. The calculated difference is used to decrement the ECX register (holding the byte count) and to increment the extended source index (ESI) register (holding the source address). The CPU core 14 requests a byte read over the C-bus 30 at the address contained in the ESI register while asserting the MEM_BB line 23 to fill the blit buffer area with data from system memory 36. The MEM_BB instruction repeats, sixteen bytes (a "cache line") at a time, until the ECX register is decremented to zero indicating that all the bytes specified in the byte count have been transferred.

Figure 4:
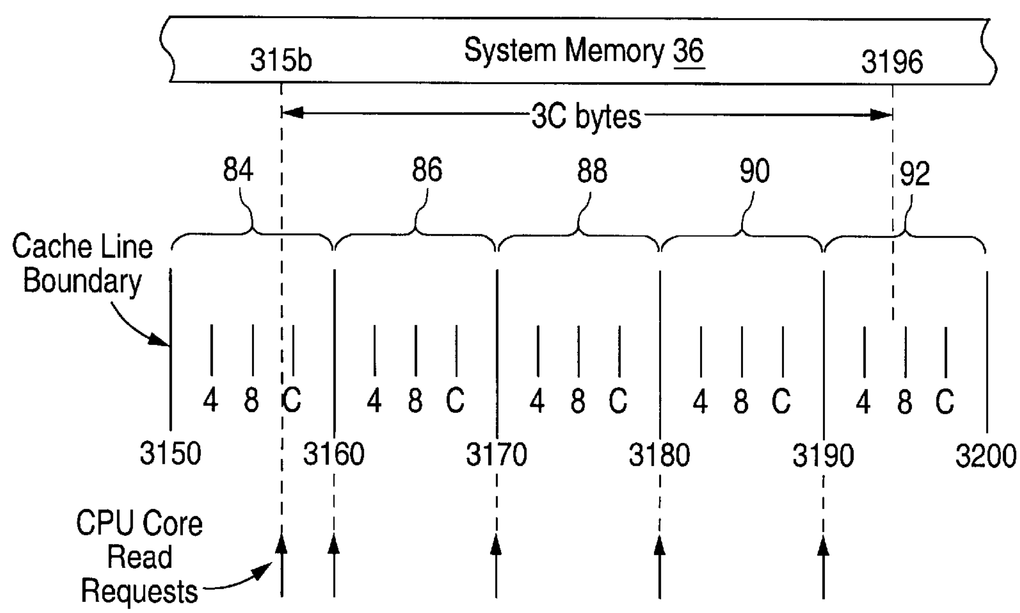

Reference is now made to FIG. 4 which depicts a diagram relating system memory, cache line boundaries, and CPU core read requests, for a specific example in accordance with the principles of the present invention. In this example, the starting source address in hexadecimal for system memory 36 is 315*bh* and a byte transfer count of 3Ch. Accordingly, the ESI register is set to 315*bh* and the ECX register is initialized to 3Ch. The first recursion 84 of the MEM_BB instruction transfers a burst of sixteen bytes, however, as specified by the least four significant bits on the align bus 25 in FIG. 2, (which in this example is hexadecimal b or binary 1011), only the upper five bytes of data in the cache line are needed (i.e. 315*b*, 315*c*, 315*d*, 315*e*, and 315*f*), resulting in the contents of the ECX register being decremented by five (the difference between the starting address 315*bh* and the beginning of the subsequent cache line 3160*h*) and the contents of ESI being incremented to 3160*h*. The second recursion 86 of the MEM__BB instruction transfers a second burst of sixteen bytes of data resulting in the contents of the ECX register being decremented by sixteen (the size of the cache line) to 27*h* and the contents of ESI being incremented to 3170*h*. The third recursion 88 of the MEM__BB instruction transfers a third burst of byte data resulting in the contents of the ECX register being decremented by sixteen and the contents of ESI being incremented to 3180*h*. The fourth recursion 90 of the MEM__BB instruction transfers a fourth burst of byte data resulting in the contents of the ECX register being decremented by sixteen and the contents of ESI being incremented to 3190*h*. Finally, the fifth recursion 92 of the MEM__BB instruction transfers a fifth burst of sixteen bytes. In this example, only the first six bytes of data in the cache line are needed (i.e. 3190–3195). The ECX register is never decremented below zero and the ESI register is always incremented by the same amount as the ECX register is decremented. In this example, the ECX is decremented by six in the fifth recursion 92 and therefore, the ESI register is incremented by six, leaving a final value of 3196*h* in the ESI register.

5. Conclusion

Although the Detailed Description of the invention has been directed to a certain exemplary embodiment, various modifications of this embodiment, as well as alternative embodiments, will be suggested to those skilled in the art. The invention encompasses any modifications or alternative embodiments that fall within the scope of the Claims.

What is claimed is:

1. In a processing system having a cache, a method of transferring data from a first block of memory to a second block of memory partitioned out of the cache as non-cacheable scratchpad memory, comprising the steps of:

(a) executing an instruction having a source operand;

(b) transferring data from the first block of memory to the second block of memory starting at the source operand and continuing in predetermined increments up until a predetermined size without caching data from the first block of memory, and, (c) performing protection and privilege checks on the source operand and subsequent operands defined by the predetermined increments.

2. A method as recited in claim 1 wherein the predetermined size in step (b) is further defined by a step of specifying a size operand.

3. A method as recited in claim 1 wherein the first block of memory is system memory.

4. A method as recited in claim 1 wherein the predetermined increments terminate on a cache line boundary.

5. A method as recited in claim 1 further comprising a step of expunging the first block of memory from the cache before step (b) if the first block of memory resides in the cache.

6. A processing system with selectable cacheability for transferring data from a first block of memory to a second block of memory comprising:

(a) a cache; and, (b) a core, responsive to executing a predetermined instruction, to transfer a block of data in predetermined increments from the first block of memory to the second block of memory partitioned out of the cache as non-cacheable scratchpad memory without caching the first block of memory and performing address calculations with protection and privilege checks on the block of data.

7. A processing system as recited in claim 6 wherein the first block of memory is system memory.

8. A processing system as recited in claim 7 wherein the system memory includes a frame buffer.

9. A processing system as recited in claim 6 wherein the predetermined increments terminate on a cache line boundary.

10. A processing system as recited in claim 6 further comprising a graphics pipeline coupled to the cache and the core.

* * * * *